United States Patent
Bennett et al.

(10) Patent No.: US 10,457,506 B1
(45) Date of Patent: Oct. 29, 2019

(54) ENHANCED DEPLOYMENT OF SAFETY CAGE APPARATUS FOR TANKS ON VEHICLES

(71) Applicant: SAM CARBIS ASSET MANAGEMENT, LLC, Florence, SC (US)

(72) Inventors: Ronald W Bennett, Florence, SC (US); John Wesley Layton, Jr., Florence, SC (US); Morris H Cusaac, Florence, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 0 days.

(21) Appl. No.: 16/052,228

(22) Filed: Aug. 1, 2018

Related U.S. Application Data

(60) Provisional application No. 62/579,321, filed on Oct. 31, 2017.

(51) Int. Cl.
*B65G 69/22* (2006.01)
*B65G 69/28* (2006.01)
*B65G 69/30* (2006.01)
*B60R 3/00* (2006.01)
*E04G 5/00* (2006.01)

(52) U.S. Cl.
CPC .......... *B65G 69/2876* (2013.01); *B60R 3/005* (2013.01); *B65G 69/22* (2013.01); *B65G 69/30* (2013.01); *E04G 5/001* (2013.01)

(58) Field of Classification Search
CPC .... B60R 3/005; B65G 69/22; B65G 69/2876; E04G 5/001; E04G 5/141
USPC .......................... 14/71.5, 71.7; 182/112, 137
See application file for complete search history.

(56) References Cited

U.S. PATENT DOCUMENTS

| | | | |
|---|---|---|---|
| 4,679,657 A | 7/1987 | Bennett et al. | |
| 5,042,612 A | 8/1991 | Bennett et al. | |
| 5,392,878 A | 2/1995 | Bennett et al. | |
| 6,502,267 B2 | 1/2003 | MacDonald et al. | |
| 7,140,467 B2 | 11/2006 | Cook | |
| 7,216,741 B2 | 5/2007 | MacDonald et al. | |
| 8,015,647 B2 | 9/2011 | Bennett | |
| 8,403,109 B2* | 3/2013 | Bennett | E06C 7/16 182/113 |
| 8,479,882 B2* | 7/2013 | DuBose | B60P 1/00 182/113 |
| 8,745,799 B1 | 6/2014 | Thomasson et al. | |
| 9,273,475 B1* | 3/2016 | DuBose | B60P 1/00 |
| 2012/0006618 A1* | 1/2012 | DuBose | B60P 1/00 182/112 |

* cited by examiner

*Primary Examiner* — Gary S Hartmann
(74) *Attorney, Agent, or Firm* — Dority & Manning P.A.

(57) ABSTRACT

A cage for surrounding a section of a work area of the top of rolling stock forms part of a portable fall protection device that includes a positioning mechanism capable of telescoping, folding and pivoting motions that are maneuvered by pneumatically-powered or hydraulically-powered apparatus. A gate, lock, pressure lines, valves and control devices are combined with the cage to ensure proper deployment of worker fall protection in this working environment.

7 Claims, 12 Drawing Sheets

ENHANCED DEPLOYMENT OF SAFETY CAGE APPARATUS FOR TANKS ON VEHICLES

CROSS-REFERENCE TO RELATED APPLICATIONS

This application claims priority to U.S. provisional patent application Ser. No. 62/579,321 filed on Oct. 31, 2017.

STATEMENT REGARDING FEDERALLY SPONSORED RESEARCH OR DEVELOPMENT

Not applicable.

FIELD OF THE INVENTION

The subject matter disclosed herein generally involves apparatus for deploying fall protection equipment that permits worker access to the tops of rolling stock, and particularly so-called worker safety cages that can be lowered down onto the tops of rolling stock.

BACKGROUND OF THE INVENTION

Before workers are permitted to access the tops of rolling stock (tank trucks, tank railroad cars, etc.), this work environment should be secured to reduce the likelihood of workers falling. This environment typically is secured with the aid of a cage that must be deployed surrounding the portion of the top of the rolling stock where the workers must perform their duties. Also typical of this environment is a gangway that has a distal end connected to the cage. The proximal end of the gangway is anchored at a secure location from which workers can walk across the gangway to the top of the rolling stock. The gangway is provided with hydraulic or pneumatic apparatus by which the gangway can be moved between an elevated storage position above the rolling stock to a lowered position even with the height of the top of the rolling stock.

In one type of these gangways such as disclosed in U.S. Pat. Nos. 5,042,612; 5,392,878 and 7,140,467, which are hereby incorporated herein by this reference for all purposes, a proximal end of the gangway can be carried on one or more stanchions that extend vertically from one respective end of the loading platform. The gangway rides up and down along the stanchions like an elevator car between a relatively elevated storage orientation with respect to the top of rolling stock and a relatively lowered operative orientation with respect to the top of rolling stock. In another type of these gangways such as disclosed in U.S. Pat. Nos. 4,679,657; 7,216,741 and 8,015,647, which are hereby incorporated herein by this reference for all purposes, a proximal end of each of the respective gangways is pivotally connected to one respective end of the loading platform and can be moved pivotally like a drawbridge between a relatively elevated storage orientation respect to the top of rolling stock and a relatively lowered operative orientation with respect to the top of rolling stock. As explained for example in U.S. Pat. No. 6,502,267, which is hereby incorporated herein by this reference for all purposes, hydraulic or pneumatic apparatus is employed to move the gangway between the raised storage orientation and the lowered deployed orientation. A fall protection cage is attached to the distal end of the gangway so that it can be positioned over the top of the rolling stock.

Additional hydraulic or pneumatic apparatus is employed to extend and retract a gangway extension platform from beneath the distal end of the gangway. The gangway extension platform is extended forward until positioned to reach the top of the rolling stock. The cage typically is provided with depending panels that afford additional fall protection by being adjustably pivotable depending on the size and orientation of the cage in relation to the size and configuration of the top of the rolling stock. Still further hydraulic or pneumatic apparatus is required to deploy and retract the cage's pivoting panels. Each of these pneumatically-powered or hydraulically-powered apparatus must be operated individually and in the proper sequence in order to ensure proper deployment of worker fall protection in this working environment. Otherwise, while one worker is manipulating one of these deployment apparatus, another worker may begin walking on the gangway and actually reach the working site before all of the fall protection equipment is fully deployed and thus inadvertently be placed at greater risk of falling without protection. Additionally, a failure of the hydraulic or pneumatic power source can leave the apparatus improperly positioned and/or configured, and thus unable to ensure the best conditions for worker safety. Accordingly, a need exists for apparatus that addresses these issues.

The tops of rolling stock typically are furnished with some sort of railing structure that runs the length and width of the area where workers are at risk of falling from the top of the rolling stock. Due to the variety of different configurations for such railing structures, the cage configuration must be placed so as to accommodate the railing structure in a way that secures fall protection for the workers performing tasks at the top of the rolling stock. Having personnel on hand who are sufficiently competent to manipulate the cages appropriately with respect to the environments where the loading stock is parked and with respect to the configuration of the various railing structures also poses problems. Less competent personnel take longer to deploy the cages, and securing personnel sufficiently competent to deploy the cages can delay the performance of the tasks and tie up loading sites while the requisite personnel are secured. Such delays add additional cost to the performance of these tasks. However, until this secure placement has been effected, workers should not be permitted access to the top of the rolling stock. Accordingly, a need exists for apparatus that addresses these issues.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which.

Figure 1:
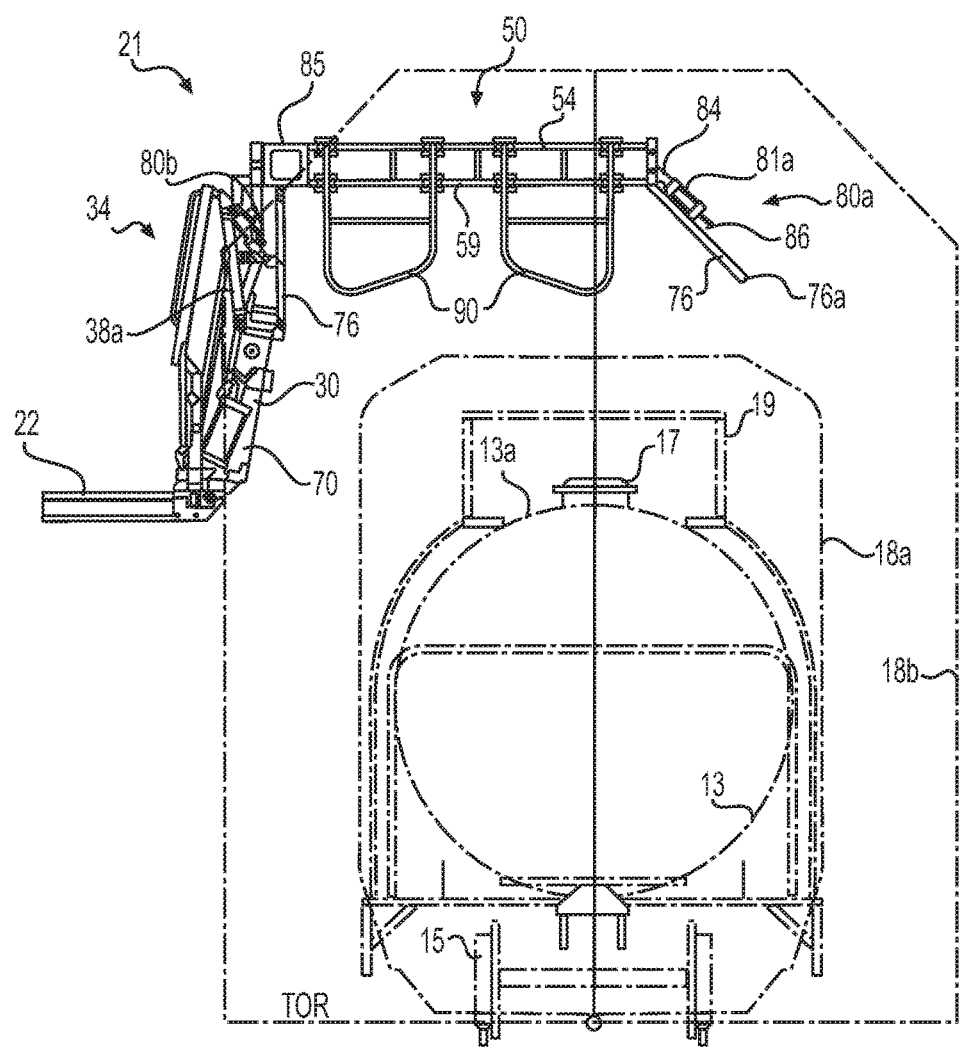
FIG. 1 is an end view of an embodiment of the present invention wherein the gangway is disposed in a storage orientation before being lowered toward the top of a tank of a railcar for which the Standard Plate C Envelope is schematically represented by a chain-dashed outline, a vertical centerline of which being shown in relation to the edge of an elevated loading platform. The cage attached to the distal end of the gangway is held above the Standard Plate C Envelope, and the pivoting depending panel is shown pivoted away from the cage as would be the case before the cage is lowered atop the tank.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF EXEMPLARY EMBODIMENTS OF THE INVENTION

Reference will now be made in detail to present exemplary embodiments of the invention, wherein one or more examples of which are illustrated in the accompanying drawings. The detailed description uses numerical and letter designations to refer to features in the drawings. Like or similar designations in the drawings and description have been used to refer to like or similar parts of the embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 2:
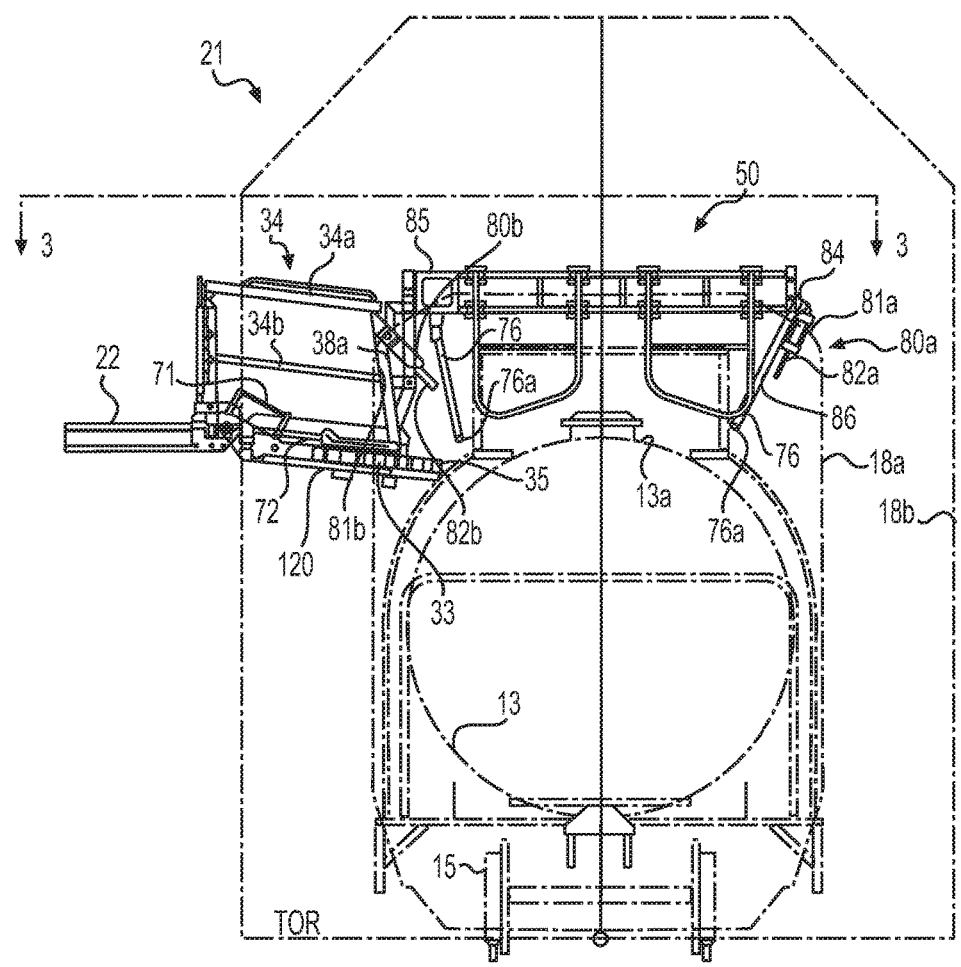
FIG. 2 is an end view of a front plan view taken in FIG. 3 along the sight lines of the arrows designated 2-2 of an embodiment of a selectively deployable fall protection enclosure disposed in the working orientation above a railroad tank car shown in dashed outline
Figure 3:
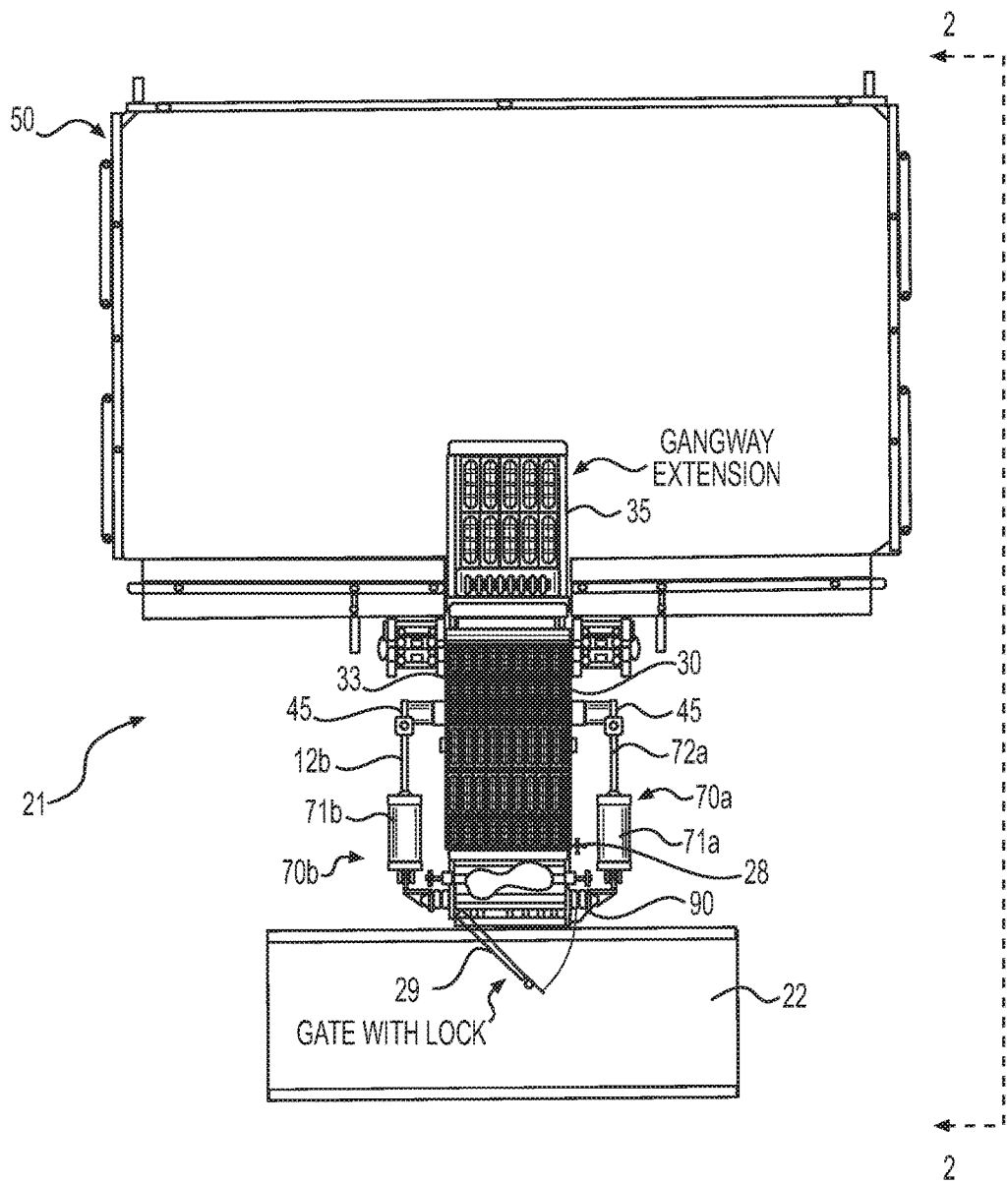
FIG. 3 is a top plan view taken in FIG. 2 along the sight lines of the arrows designated 3-3 of an embodiment of a selectively deployable fall protection enclosure disposed in the working orientation above a railroad tank car shown in dashed outline. Moreover, the extension platform is depicted in dashed outline deployed from beneath the gangway floor and at a descending incline toward the top of the tank.

FIGS. 1-3 are borrowed from U.S. Pat. No. 8,745,799, which is commonly owned and hereby incorporated herein by this reference for all purposes, to illustrate some of the components suitable for embodiments of the present invention. FIGS. 1-3 depict an embodiment of an apparatus that provides selectively deployable worker access to at least a portion of the top 13a of a container 13 disposed above the ground and generally indicates same by the reference numeral 21. Moreover, the apparatus 21 provides fall protection. The container shown in FIGS. 1-3 is a tank 13 on a railcar 14, but such container 13 also could be carried on a truck for example. While some embodiments of the apparatus 21 may include an elevated platform 22, the two main components of the apparatus 21 are a gangway 30 and an enclosure that often is called a fall protection cage 50. As used herein, the term inboard means closer to or in a direction toward the platform 22 and away from the side of the tank 13 that is closer to the platform 22, while the opposite term outboard means farther from or in a direction away from the platform 22. The gangway 30 has a forward end connected to an inboard side of the fall protection cage 50 at an access opening defined through the inboard side. The back end of the gangway 30 is disposed spaced apart from the forward end.

As noted above, some embodiments of the apparatus 21 of the present invention may include an elevated platform, which is schematically represented in FIG. 3 by the element designated by the numeral 22. The details of the platform 22 are varied and conventional and can be learned from one or more of U.S. Pat. Nos. 4,679,657; 5,042,612; 5,392,878; 7,140,467, 7,216,741 and 8,015,647; the disclosure of each of the foregoing patents being hereby incorporated herein in its entirety for all purposes by this reference. As schematically shown in FIGS. 1-3, the elevated platform typically has a deck 22a suspended above the ground that underlies the platform 22. The embodiments of the apparatus 21 of the present invention typically are retrofitted to platforms 22 that already exist.

The standard dimensional envelope occupied by a railway tank car, commonly referred to as the Standard Plate C Envelope, applies to about 95% of the rolling rail stock throughout North America and is schematically represented in FIG. 1 in an outline formed of chain-dashed lines. The vertically extending chain-dashed line running through the center of the tank 13 in FIG. 1 schematically represents the vertical centerline of the Standard Plate C Envelope and often provides a convenient frame of reference for measuring the distance from the nearest edge of the elevated stationary loading platform. The vertically extending chain-dashed line to the left of the vertical centerline of the Standard Plate C Envelope in FIG. 1 schematically represents the inboard side of the Standard Plate C Envelope in relation to an elevated stationary loading platform. The vertically extending chain-dashed line to the right of the vertical centerline of the Standard Plate C Envelope in FIG. 1 schematically represents the outboard side of the Standard Plate C Envelope in relation to the elevated stationary loading platform.

Figure 4:
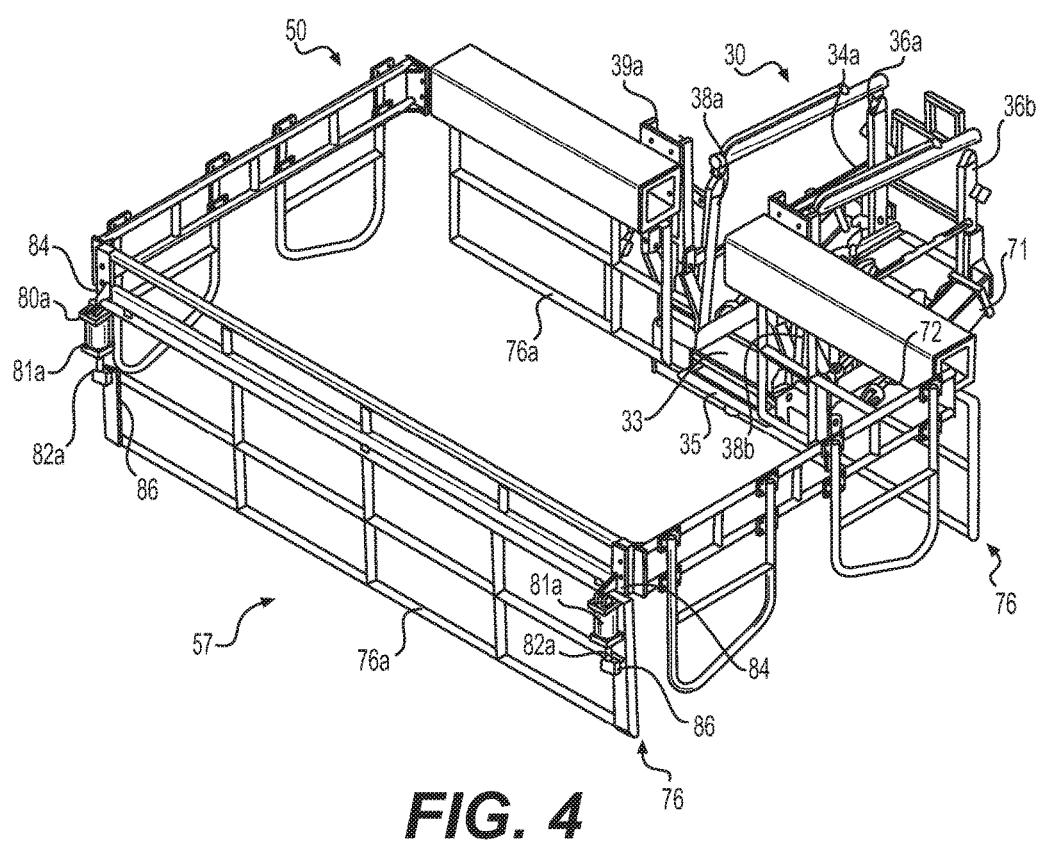
FIG. 4 is an elevated perspective view of an embodiment of a gangway fitted with a gate that blocks access to the entrance of the gangway and includes a gangway lock that operates automatically with the pneumatic or hydraulic circuit that controls deployment of the gangway and attached cage and shown in the deployed orientation of the gangway and cage.

As embodied herein and in FIGS. 1-3 for example, the apparatus 21 desirably includes a gangway, which is indicated generally by the numeral 30. As shown in FIGS. 1-3 for example, the gangway 30 elongates in an outboard direction. Referring to FIGS. 1-3, the gangway 30 defines an inboard end 30a pivotally connected to the platform 22 and an outboard end 30b extending opposite the inboard end 30a. As embodied herein and shown in FIG. 3 for example, the width of the gangway 30 is defined between a first side 31 of the gangway 30 and a second side 32 of the gangway 30 opposing the first side 31 of the gangway 30. As shown in FIGS. 3 and 4 for example, the gangway 30 provides a walking surface 33 upon which workers can walk from the platform 22 onto the top 13a of the tank 13. In its operative or deployed orientation shown in FIGS. 2-4 for example, the walking surface 33 extends generally horizontally between the platform 22 and the top 13a of the tank 13 that is to be accessed by workers for inspection, loading or unloading. In its storage orientation shown in FIGS. 1 and 5 for example, the gangway 30 and its walking surface 33 is pivoted above the platform 22 and disposed generally at an angle with respect to the platform 22.

As shown in FIGS. 1 and 2 for example, the walking surface 33 of the gangway 30 typically is bounded on each respective opposite side by a gangway railing that is indicated generally by the numeral 34. The gangway railing 34 desirably is configured so that it can fold to permit the gangway 30 to be selectively raised above the normal horizontal walking plane and lowered to dispose the walking surface 33 of the gangway 30 in a position suited for workers to move between the top 13a of the tank 13 and the platform 22.

Referring to FIGS. 1-3, because of the curved shape of the top 13a of the main body of a tank 13, which is shown in chain dashed outline, carried by a standard tank railcar and/or the likelihood of encountering slippery surfaces thereon, provision must be made for protection of workers who might slip and fall from the top 13a of the tank 13. Thus, often the top 13a of the storage container 13 carried on railcars or trucks is outfitted with a railing system 19 around the top 13a of the tank 13. This railing system 19 typically includes posts vertically extending above the top 13a. End rails of the railing system 19 are connected to the tops of the posts and extend laterally across the width of the tank 13. Similarly, the railing system 19 includes side rails that extend lengthwise across the top 13a of the tank 13. Typically, the railing system 19 will surround a hatch 17 that controls access to the interior of the tank 13.

Providing additional railcar access fall protection can involve the deployment of a cage 50 that must surround a particular region of the top 13a of the rolling stock. However, in deploying this additional cage 50, the pre-existing railing system 19 must be accommodated in a way that does not compromise the desired fall protection for the workers engaged around the top 13a of the tank 13 in performing the tasks entailed by their duties. It is the deployment apparatus associated with these sorts of cages 50 that is the subject of the various embodiments of the present invention described more fully below. Examples of some components of embodiments of the deployment apparatus that are intended for addressing environments at fixed loading stations are schematically shown in FIGS. 1-5.

For the sake of convenience, the embodiments of the cages 50 of the present invention will be described with reference to the following conventions. The length of the rolling stock with respect to which the cage 50 is to be positioned during its intended use providing fall protection for workers performing duties on top 13a of the rolling stock, whether the particular rolling stock should be a tank rail car or a tank truck, will define the longitudinal direction. The width of the rolling stock defines the transverse direction, which is perpendicular to the longitudinal direction. The vertical direction is perpendicular to both of the longitudinal direction and the transverse direction and is the direction along which the gravitational force acts on the rolling stock and on the cage 50 and associated deployment apparatus for the cage. The side of each cage 50 through which the workers gain entrance into the cage when the cage is positioned to perform its intended function to provide fall protection for workers performing duties on top 13a of the rolling stock will be considered the inboard side of the cage 50 and is one of the two sides of the cage 50 that extends in the longitudinal direction, which is a direction that is parallel to the length of the rolling stock according to the convention adopted herein. The other side of the cage 50 that extends in the longitudinal direction is termed the outboard side of the cage 50, which is disposed spaced apart in the transverse direction from the inboard side of the cage 50. Each of the respective opposite ends of the inboard side and outboard side of the cage 50 is connected to each other by the span of a respective end section of the cage 50. Thus, a first end of the outboard side of the cage 50 is connected to a first end of the inboard side of the cage by a first end section of the cage that extends in the transverse direction to span between these two opposing first ends of the respective inboard side and outboard side of the cage 50. Similarly, the opposite end of the outboard side of the cage 50 is the second end that is connected to the second end of the inboard side of the cage by a second end section of the cage that also extends in the transverse direction. The second end section of the cage 50 is disposed opposite the first end section of the cage and spaced apart in the longitudinal direction from the first end section of the cage by a distance according to the length of the respective inboard side of the cage and the length of the respective outboard side of the cage 50. Moreover, in a presently preferred embodiment, the configuration of each of the two first and second end sections of the cage 50 typically is identical so as to simplify the inventory necessary to manufacture this presently preferred embodiment of the cage.

As shown in FIGS. 1, 2, 4 and 5B, the present invention keeps the fall protection cage 50 generally in a horizontal orientation with respect to the ground by pivoting the gangway 30 with respect to each pair of stanchions and pivotally connected adjustable abutment to which the fall protection cage 50 is attached. As shown in FIG. 4 for example, the gangway 30, the stanchions 38a, 38b and the railing members 34a, 34b are pivotally connected together to form parallel linkages with one another and with a respective inboard upright 36a on the same side of the gangway 30.

As shown in FIGS. 1-3, the gangway 30 and fall protection cage 50 are configured to be selectively raised and lowered together by cage deployment cylinders, which desirably are double-acting pressurized cylinders indicated generally by the designating numeral 70. Each double-acting linear cylinder 70 has one end pivotally anchored to the platform 22 or the proximal end of the gangway 30 and the opposite end pivotally connected to the distal end of the gangway 30. As known in the art, each double-acting linear cylinder 70, also known as an actuating cylinder, includes a pressurized enclosure 71 (FIG. 4) and a piston rod 72 (FIG. 4) selectively extendable from and contractable into the pressurized enclosure 71. Each pressurized enclosure 71 of each cage deployment cylinder 70 includes a first chamber sealed by a piston from a second chamber, and a piston rod 72 extends from one opposite side of the piston. As known in the art, such double-acting linear cylinders 70 desirably can be used to selectively move the gangway 30 back and forth between a storage configuration above the designed clearance envelope 18a (FIGS. 1 and 5A) and an operative configuration (FIGS. 2, 4 and 5B) in which workers can walk upon the gangway 30 between the platform 22 and the top 13a of the storage container 13.

In this particular embodiment shown in FIG. 3 for example, a respective double-acting lifting cylinder 70a and 70b functions as a gangway deployment cylinder 70 having one end connected to the back end of the gangway 30 and an opposite end connected to an undercarriage brace 45 on which a distal section of the gangway 30 is supported and carried. Because the cage 50 is fixed to the distal end of the gangway 30, the gangway deployment cylinder 70 likewise functions as a cage deployment cylinder 70 and is thusly configured for selectively deploying the fall protection cage 50 to assume a preselected position within the range of movement between the storage orientation and a deployed orientation. Each double-acting cylinder 70a, 70b desirably is powered by pressurized gas (air or nitrogen at about 80 psi gauge) and is a pneumatic cylinder, but alternatively can be a hydraulic cylinder that is powered by hydraulic fluid. When the piston rods 72 are retracted within the pressurized enclosures 71 as shown in FIG. 1, the gangway 30 is pushed vertically upward away from the ground underlying the platform 22, at the same time lifting the cage 50 vertically upward into the storage orientation depicted in FIG. 1. When the piston rods 72 are extended away from the pressurized enclosures 71 as shown in FIGS. 2 and 4, the upper surface of the gangway 30 is disposed generally at a walkable level and thus provides a walking surface 33 for the workers to move between the platform 22 and the top 13a of the container or tank 13 that is to be loaded or unloaded and with the cage 50 in the deployed orientation shown in FIG. 2 and surrounding the top 13a of the container or tank 13.

There are a number of configurations suitable for using double-acting linear cylinders 70, and/or single-acting linear cylinders and/or springs and parallel linkages to urge one end of the parallel linkages in a certain direction. The configuration shown in FIGS. 1-3 is but one of these configurations, and the present invention is not deemed limited to only the illustrated configuration. In another possible configuration, the gangway 30 can be elevated to assume the storage orientation when the piston rods 72 are extended out of the pressurized enclosures 71 and deployed to permit access to the top 13a of the container 13 when the piston rods 72 are retracted within the pressurized enclosures 71. All such configurations known in the art are intended to be encompassed by the present invention.

As schematically shown in FIGS. 1, 2, 4, 5A and 5B for example, pivotally depending from each of the inboard side and outboard side of the cage 50 is at least one depending grille 76 having a free edge 76a that is spaced apart from the end of the grille 76 that is pivotally connected to the cage 50. Each grille 76 is pivotally connected along one side of the fall protection cage 50 with a range of pivotal movement between a closed position disposing the free edge 76a of the grille 76 toward the interior of the fall protection cage 50 as in FIG. 5B and an open position disposing the free edge 76a of the grille 76 away from the interior of the fall protection cage 50 as in FIG. 5A. As schematically shown in FIGS. 6, 7, 8 and 9, each grille 76 is provided with at least one grille cylinder 80 connected to the grille 76 and configured for selectively pivoting the grille 76 to assume a preselected position within the range of pivotal movement.

In particular as embodied in FIGS. 1, 2 and 4 for example, the apparatus of the present invention desirably includes at least a first double-acting linear cylinder 80a that includes a pressure-tight enclosure 81a and a piston 82a selectively extendable from and contractable into the enclosure 81a under the control of the operator via an apparatus for selectively controlling the aforementioned source of pressurized fluid. One of the pressure-tight enclosure 81a and the piston 82a desirably is pivotally connected to a mount 84 that extends in an outboard direction from the outboard side of the fall protection cage 50. The other one of the pressure-tight enclosure 81a and the piston 82a of the first double-acting linear cylinder 80a desirably is pivotally connected to a first depending grille 76. Desirably, as shown in FIGS. 1 and 2 for example, the first double-acting linear cylinder 80a is pivotally connected to the first depending grille 76 via a strut 86 that extends in a direction that is normal to the plane of the depending grille 76 and extending therefrom in the outboard direction. Desirably, as shown in the views of FIGS. 1 and 2 for example, at least a second double-acting linear cylinder 80b that is like the first and thus includes a pressure-tight enclosure 81b and a piston 82b selectively extendable from and contractable into the enclosure 81b, has one of the enclosure 81b and the piston 82b pivotally connected to a second mount (FIG. 3) that extends in an outboard direction from the outboard side of the fall protection cage 50. The other one of the enclosure 81b and the piston 82b of the second double-acting linear cylinder 80b is pivotally connected to the depending grille 76 in a manner like the first double-acting linear cylinder 80a and thus is pivotally connected to the depending grille 76 via a second strut that extends in a direction that is normal to the plane of the depending grille 76 and outboard therefrom.

Referring to FIGS. 1 and 2 for example, when each of the pistons 82a of each of the two double-acting linear cylinders 80a is retracted into its respective actuating enclosure 81a, the depending grille 76 that is pivotally connected to the outboard side 57 of the fall protection cage 50 is disposed in a generally outboard direction that is away from the outboard side 57 of the fall protection cage 50 and away from the gangway 30 and thus provides an open orientation of the depending grille 76 to accommodate the railing system at the top 13a of the container or tank 13 that is to be loaded or unloaded. This open orientation of the depending grille 76 is depicted in a perspective view in FIG. 5A for example. This pivoting feature of the depending grille 76 also enables the fall protection cage 50 to accommodate tanks 13 that are parked farther away from the platform 22 than is ideally suited to the loading and unloading work.

Referring to FIG. 2 for example, when the ends of the pistons 82a are extending away from the respective actuating enclosures 81a, the depending grille 76 that is pivotally connected to the outboard side of the fall protection cage 50 is disposed generally in an inboard direction away from the outboard side of the fall protection cage 50 and toward the gangway 30 and thus provides a narrowing of the gap between the fall protection cage 50 and the top 13a of the container or tank 13 that is to be loaded or unloaded. Accordingly, this pivoting feature of the depending grille 76 of the fall protection cage 50 enables the fall protection cage 50 to accommodate the different rail systems at the tops 13a of tanks 13 or tanks 13 that are parked closer to the platform 22 than is ideally suited to the loading and unloading work. Two of these narrowed orientations of the depending grille 76 are depicted respectively in a perspective view in FIGS. 4 and 5B for example. Moreover, because the double-acting linear cylinders 80a disposed on the outboard side of the fall protection cage 50 can be operated remotely, the width clearance adjustments to the outboard side of the fall protection cage 50 can be made before workers step onto the top 13a of the tank 13.

In a similar manner shown in FIGS. 1 and 2 for example, the apparatus 21 of the present invention desirably includes at least a second depending grille 76 carried pivotally by the inboard side of the fall protection cage 50 that is defined in part by the truss box members 85. As shown in FIGS. 1 and 2 for example, one end of the depending grille 76 is pivotally connected to the truss box members 85 of the fall protection cage 50 while the opposite end of the second depending grille 76 extends vertically for a substantial distance beneath the truss box members 85 of the fall protection cage 50. In embodiments like those depicted in FIGS. 1, 2 and 3 in which the fall protection cage 50 defines an enclosure that includes at least an upper rail 54 and a lower rail 59 disposed beneath the upper rail 54, the free end 76a of the depending grille 76 extends vertically for a substantial distance beneath the lower rail 59 of the fall protection cage 50.

Figure 5A:
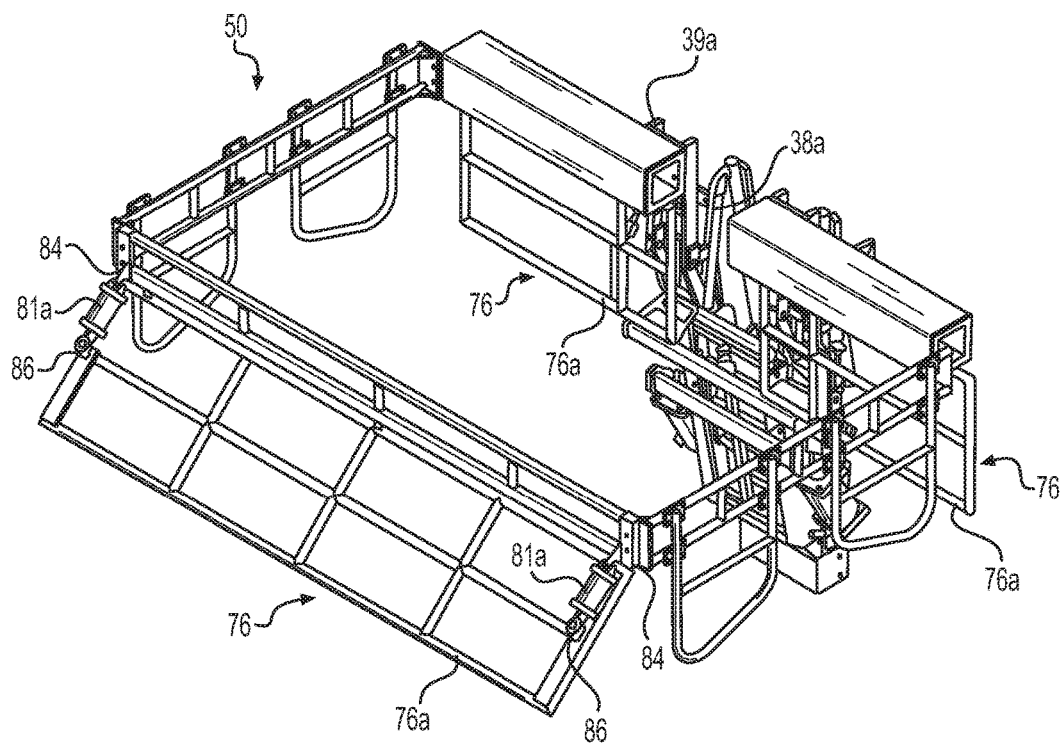
FIG. 5A is an elevated perspective view of an embodiment of a gangway and attached cage and shown in the storage orientation of the gangway and cage as in FIG. 1.
Figure 5B:
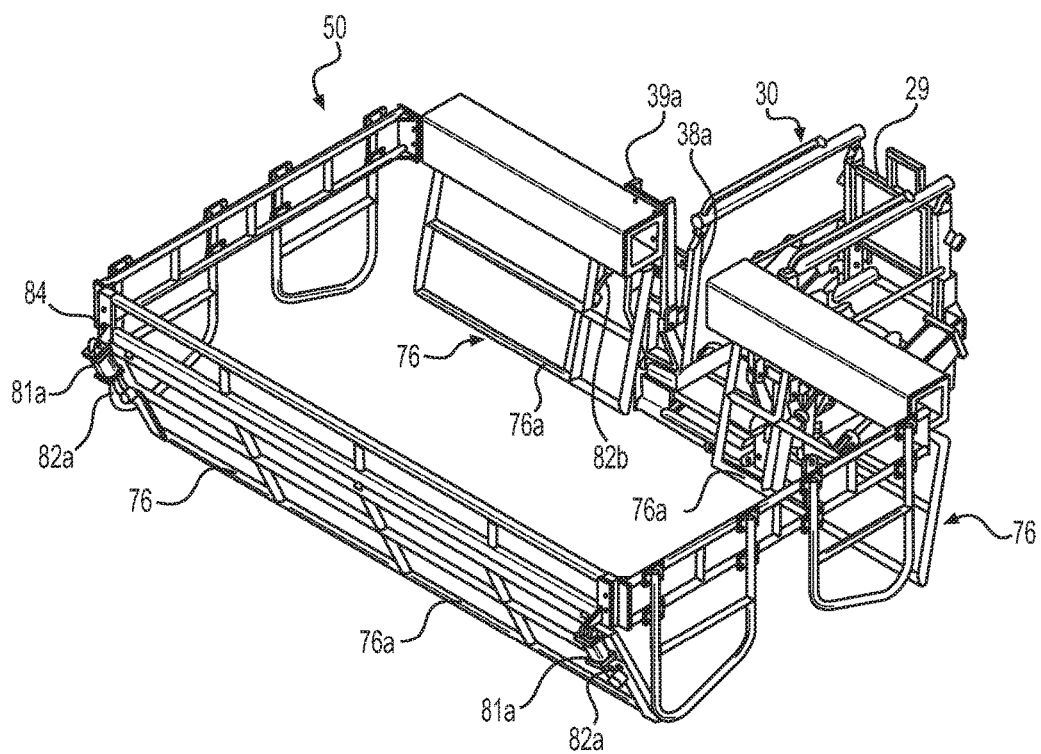
FIG. 5B is an elevated perspective view of an embodiment of a gangway and attached cage and shown in the deployed orientation of the gangway and cage as in FIG. 2.

As embodied in FIGS. 1 and 2 for example, the apparatus of the present invention desirably includes at least a first double-acting linear cylinder 80b that includes a pressure-tight enclosure 81b and a piston 82b selectively extendable from and contractable into the enclosure 81b under the control of the operator. As embodied in FIGS. 4, 5A and 5B for example, one of the enclosure 81b and the piston 82b desirably is pivotally connected to a bracket 39a that is rigidly attached to a first stanchion 38a of the gangway 30. The other one of the enclosure 81b and the piston 82b of the first double-acting linear cylinder 80b desirably is pivotally connected to the second depending grille 76. Desirably, as shown in FIG. 5B for example, the piston 82b extending from first double-acting linear cylinder (not visible in the view of FIG. 5B) is pivotally connected to the second depending grille 76 via a strut that extends in a direction that is normal to the plane of the depending grille 76 and extending therefrom in the inboard direction. Desirably, for example as depicted in the view of FIG. 2, at least a second double-acting linear cylinder 80b that is like the first and thus includes an enclosure 81b and a piston 82b selectively extendable from and contractable into the enclosure 81b, has one of the enclosure 81b and the piston 82b pivotally connected to a bracket that is rigidly attached to a stanchion of the gangway 30. The other one of the enclosure 81b and the piston 82b of the second double-acting cylinder 80b is pivotally connected to the second depending grille 76 in a manner like the first double-acting cylinder 80b and thus is pivotally connected to the second depending grille 76 via a second strut that extends in a direction that is normal to the plane of the depending grille 76 and inboard therefrom.

Referring to FIGS. 1 and 2 for example, when each of the pistons 82b of each of the two double-acting linear cylinders 80b is extended away from its respective actuating enclosure 81b, the second depending grille 76 that is pivotally connected to the inboard side of the fall protection cage 50 is disposed in a direction that is toward the center of the fall protection cage 50 and thus provides in effect an enclosing orientation of the fall protection cage 50 to narrow the gaps in the rail system at the top 13a of the container or tank 13 that is to be loaded or unloaded. This pivoting feature of the second depending grille 76 also enables the fall protection cage 50 to accommodate tanks 13 that are parked at different distances with respect to the platform 22 than is ideally suited to the loading and unloading work.

Referring to FIG. 2 for example, when the ends of the pistons 82b are retracted into the respective actuating enclosures 81b, the second depending grille 76, which is pivotally connected to the inboard side of the fall protection cage 50, is disposed generally in a direction away from the center of the fall protection cage 50 and thus provides in effect a widening of the gap between the fall protection cage 50 and the top 13a of the container or tank 13 that is to be loaded or unloaded. Accordingly, this pivoting feature of the second depending grille 76 on the inboard side of the fall protection cage 50 enables the fall protection cage 50 to accommodate differently sized and configured rail systems at the tops 13a of tanks 13 or tanks 13 that are parked farther from the platform 22 than is ideally suited to the loading and unloading work. Moreover, because the double-acting linear cylinders 80b disposed on the inboard side of the fall protection cage 50 can be operated remotely, the width clearance adjustments to the inboard side 57 of the fall protection cage 50 can be made before workers step onto the top 13*a* of the tank 13.

As embodied herein, each of the first and second depending grilles 76 can be provided by a single member that runs the entire length of the fall protection cage 50, and this embodiment is typical of the outboard side 57 of the cage 50 as shown in FIG. 4 for example. Alternatively, each of the first and second depending grilles 76 can be provided by at least two sections, each section running only a portion of the entire length of the fall protection cage 50 and having its own separately actuatable double-acting cylinder 80*a*, 80*b*, and this embodiment is typical of the inboard side of the cage 50 to allow for a worker access opening in the inboard side of the cage 50 that allows workers to move from the distal end of the gangway 30 and into the interior of the cage 50. Moreover, each section of each depending grille 76 need not cover the same portion of the length of the fall protection cage 50 as the other section of that depending grille 76 on one side, whether inboard or outboard, of the fall protection cage 50.

Figure 11:
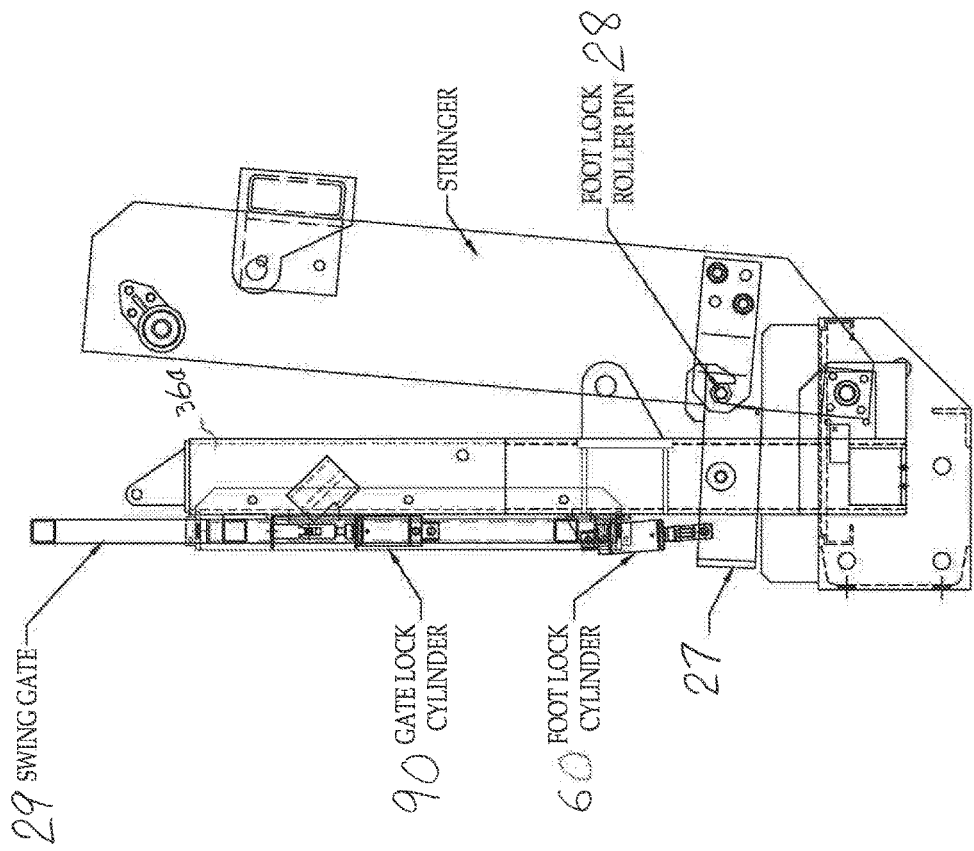
FIG. 11 is a side view taken along the lines of sight designate 11-11 in FIG. 10 and schematically representing a foot lock for an embodiment of the present invention and retaining the gangway in the storage orientation.

As schematically shown in FIGS. 3, 4, 9 and 11, the gangway 30 is provided with a gangway lock, which is configured to be foot-operated, and desirably includes a gangway locking flange 27, a roller pin 28 and a gangway lock cylinder 60, which desirably but not necessarily is connected to the gangway 30. When the gangway locking flange 27 is engaged to the roller pin 28, the gangway lock will retain the gangway 30 in the storage orientation shown in FIGS. 1 and 5A. Thus, the gangway locking flange 27 retains the gangway 30 (FIGS. 3, 4 and 9) in the storage orientation shown in FIGS. 1 and 5A in the event that pressure were to be lost from the pneumatic circuit 110. As schematically shown in FIG. 11, a central region of the gangway locking flange 27 is pivotally connected to an inboard upright 36*a*. One opposite end of the gangway locking flange 27 is pivotally connected to the piston end of the gangway lock cylinder 60. The other opposite end of the gangway locking flange 27 is configured with a hook that can be positioned to securely engage the roller pin 28. In this locked mode shown in FIG. 9, the gangway lock cylinder 60 is configured to enable the locking flange 27 to engage the roller pin 28 schematically depicted in FIG. 11 and retain the gangway 30 to be folded into the storage orientation shown in FIGS. 1 and 5A. In this stationary storage mode of operation, the cap end of the gangway lock cylinder 60 is vented to atmosphere, and the mechanical spring mechanism (schematically depicted in FIG. 6) inside the gangway lock cylinder 60 biases the piston of the lock cylinder 60 in the fully retracted orientation schematically shown in FIG. 11.

Figure 10:
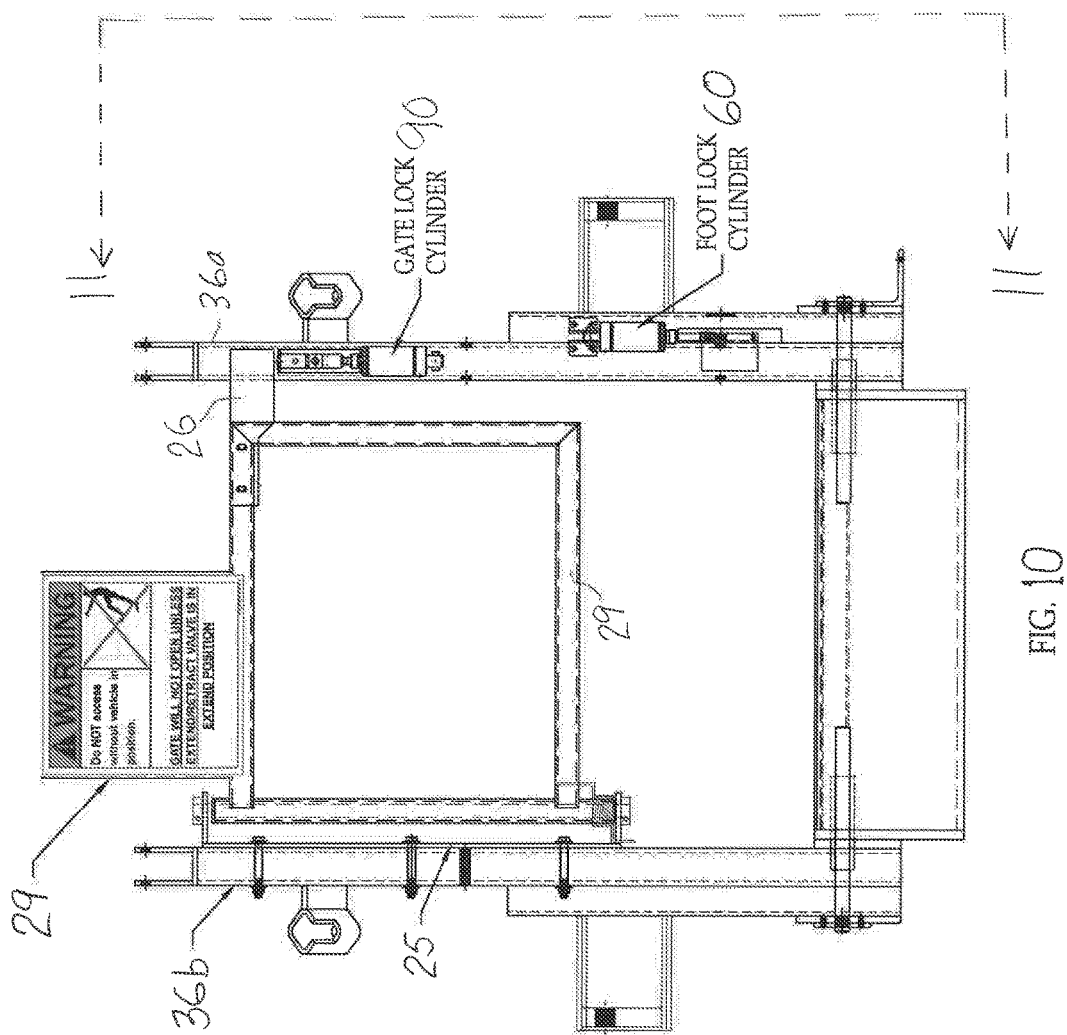
FIG. 10 is a front view of an embodiment of a gangway fitted with a gate that blocks access to the entrance of the gangway and includes a gangway lock that operates automatically with the pneumatic or hydraulic circuit that controls deployment of the gangway and attached cage and the pivoting depending panels connected to the cage.

As schematically shown in FIGS. 3, 4, 10 and 5B, the gangway 30 is provided with a gate 29 that is pivotable into a closed position that blocks access to the gangway 30 from the proximal end of the gangway 30. The gate is pivotable to an open position allowing worker access into the fall protection cage 50 via the gangway 30. As schematically shown in FIG. 10, a bracket 25 is connected to an inboard upright 36*b* and includes an upper bearing and a lower bearing that pivotally supports one side extrusion of the gate 29. A tensioning spring between the side extrusion and the lower bearing biases the gate 29 in the closed position shown in FIG. 10. The user can open the gate 29 by pivoting the gate against the biasing tension of the tension spring.

Figure 6:
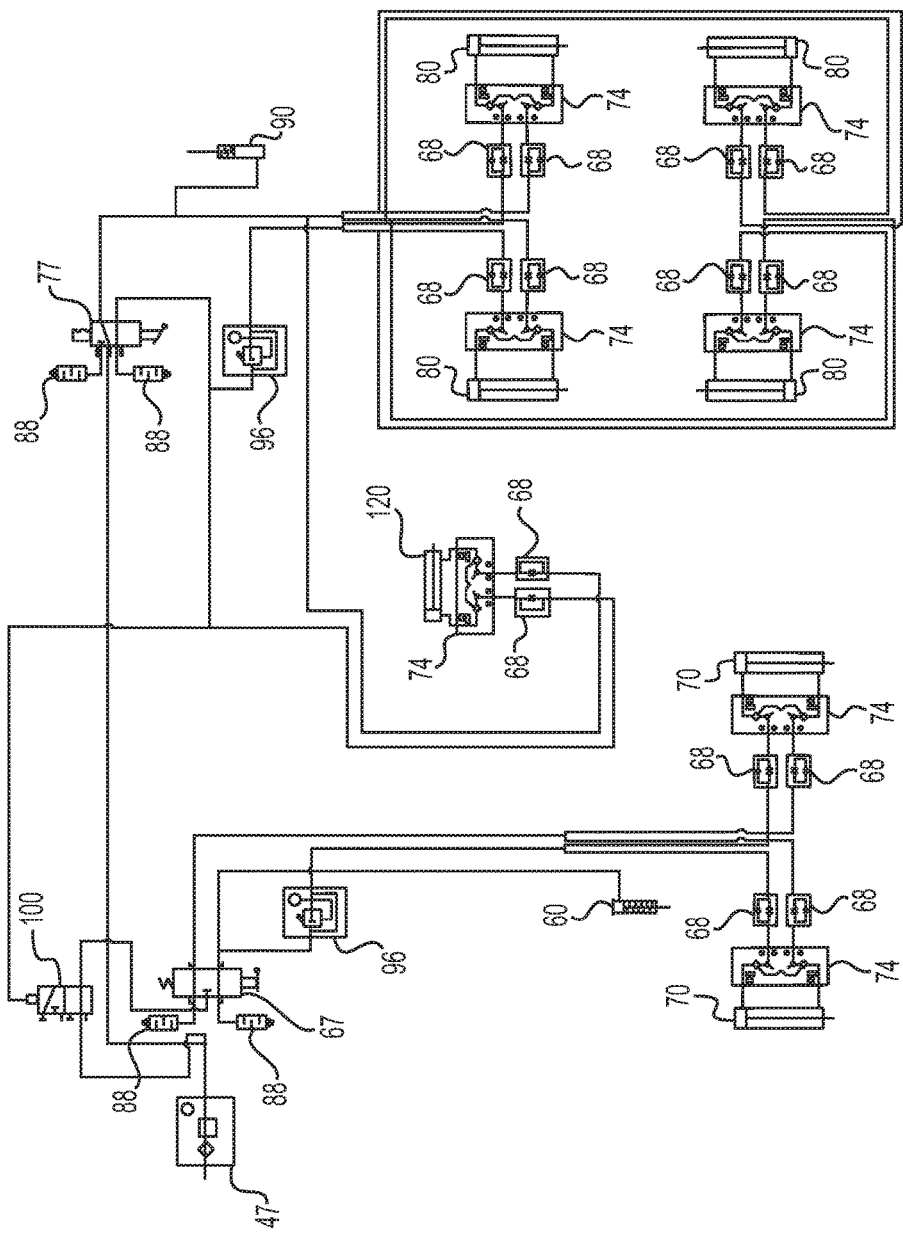
FIG. 6 is a schematic representation of a pneumatic circuit suitable for an embodiment of the present invention and configured in the stored mode in which a manually operable three-position valve is configured to maintain the gangway in its elevated storage orientation and to maintain the gangway's storage lock in the locked condition, and a manually operable two-position valve is configured to retain the gangway extension platform fully retracted beneath the floor of the distal end of the gangway, to maintain the pivoting panels attached to the cage fully extending away from the cage and to maintain the gangway lock on the gate fully locked to block worker access to the gangway.

In accordance with an aspect of the present invention, the gate 29 is provided with a gate lock that retains the gate 29 in the closed position and prevents the user from opening the gate 29. The gate lock is configured and disposed for selectively assuming a locked orientation for locking the gate in the closed position and alternatively selectively assuming an unlocked orientation for freeing the gate to assume the open position. As schematically shown in FIG. 10, the gate lock includes a gate locking flange 26 and a gate lock cylinder 90, which is operable between a locked and unlocked mode of operation. When the gate lock is engaged in the locked mode of operation, then the gate 29 will be retained in the closed orientation shown in FIGS. 4, 5B and 10. However, FIG. 10 schematically shows the gate lock in the unlocked mode of operation in which the piston rod of the gate lock cylinder 90 is retracted within the cap end of the gate lock cylinder 90 and thus does not extend across the gate locking flange 26. Thus, the gate locking flange 26 is free to move away from the inboard upright 36*a* as the gate 29 is free to pivot on the bearings carried by the bracket 25 that is attached to the opposite inboard upright 36*b*. When the piston rod of the gate lock cylinder 90 extends from within the cylinder as schematically shown in FIG. 6 for example, then the piston rod will extend across the gate locking flange 26 and thus prevent pivoting movement of the gate 29 away from the inboard upright 36*a*. The cap end of the gate lock cylinder 90 is pressurized in the operating mode depicted in FIG. 6 so that the gate lock is in the locking mode and the gate 29 is retained in the closed position.

As schematically shown in FIGS. 2, 3 and 6 for example, the gangway 30 is provided with a gangway extension 35 that selectively slides outwardly from beneath the walking surface 33 of the gangway 30 and inwardly to return beneath the walking surface 33 of the gangway 30. The gangway extension platform 35 is slidably connected to the forward end of the gangway 30 with a range of sliding movement between a retracted position disposing the gangway extension platform 35 beneath the gangway 30 and an extended position disposing the free edge of the gangway extension platform 35 away from the gangway 30. The gangway extension 35 provides the worker with a pathway from the walking surface 33 at the distal end of the gangway 30 and onto the top 13*a* of the tank 13 of a railcar 14. The movement of the gangway extension 35 between the retracted position beneath the walking surface 33 and the extended position outwardly away from the distal end of the gangway 30 is propelled by the operation of a dual action pneumatic cylinder 120. The gangway extension platform cylinder 120 is operated between its fully retracted configuration, which results in complete retraction of the gangway extension 35 as shown in FIGS. 1, 4 and 5A, and its fully extended configuration, which results in complete extension of the gangway extension as shown in FIGS. 2 and 3.

In accordance with the present invention, each of FIGS. 6, 7, 8 and 9 schematically depicts an exemplary embodiment of apparatus for selectively controlling a source of pressurized fluid and thereby placing under operator control, the movement of a fall protection cage 50 between a storage orientation (FIGS. 1 and 5A) and a deployment orientation (FIGS. 2-4 and 5B) at the top of rolling stock. The apparatus for selectively controlling a source of pressurized fluid also is configured to place under operator control, the movement of the gangway lock, the gate lock, the depending grilles 76, and the gangway extension platform 35. The embodiment schematically shown in FIGS. 6, 7, 8 and 9 includes a pneumatic circuit 110 that includes members of the apparatus for selectively controlling a source of pressurized fluid. The straight lines connecting between the various components schematically depicted in FIGS. 6, 7, 8 and 9 represent conduits (aka pressure lines) that are configured to carry pressurized fluid that is regulated by and/or activates each component. The conduits are connected where the straight lines intersect, unless a bypass is indicated schematically by a curved segment where the lines intersect.

Each of FIGS. 6, 7, 8 and 9 schematically depicts a pneumatic circuit 110 that can be configured by operation of a three-position lever operated directional valve 67 to raise and lower the gangway 30 and to release the gangway locking flange 27. FIG. 6 shows the pneumatic circuit 110 configured so that the gangway locking flange 27 retains the gangway 30 (FIGS. 3, 4 and 9) in the storage orientation shown in FIGS. 1 and 5A in the event that pressure were to be lost from the pneumatic circuit 110. Each of FIGS. 6, 7, 8 and 9 schematically depicts a pneumatic circuit 110 that can be configured by operation of a two-position lever operated directional valve 77 to extend/retract the gangway extension platform 35 from beneath the floor 33 of the distal end of the gangway 30, to raise/lower the pivoting grilles 76 attached to each of the inboard and outboard sides of the cage 50, and to lock/unlock the gate lock on the gate 29 (FIGS. 3 and 8) controlling worker access to the walking surface 33 of the gangway 30.

Figure 7:
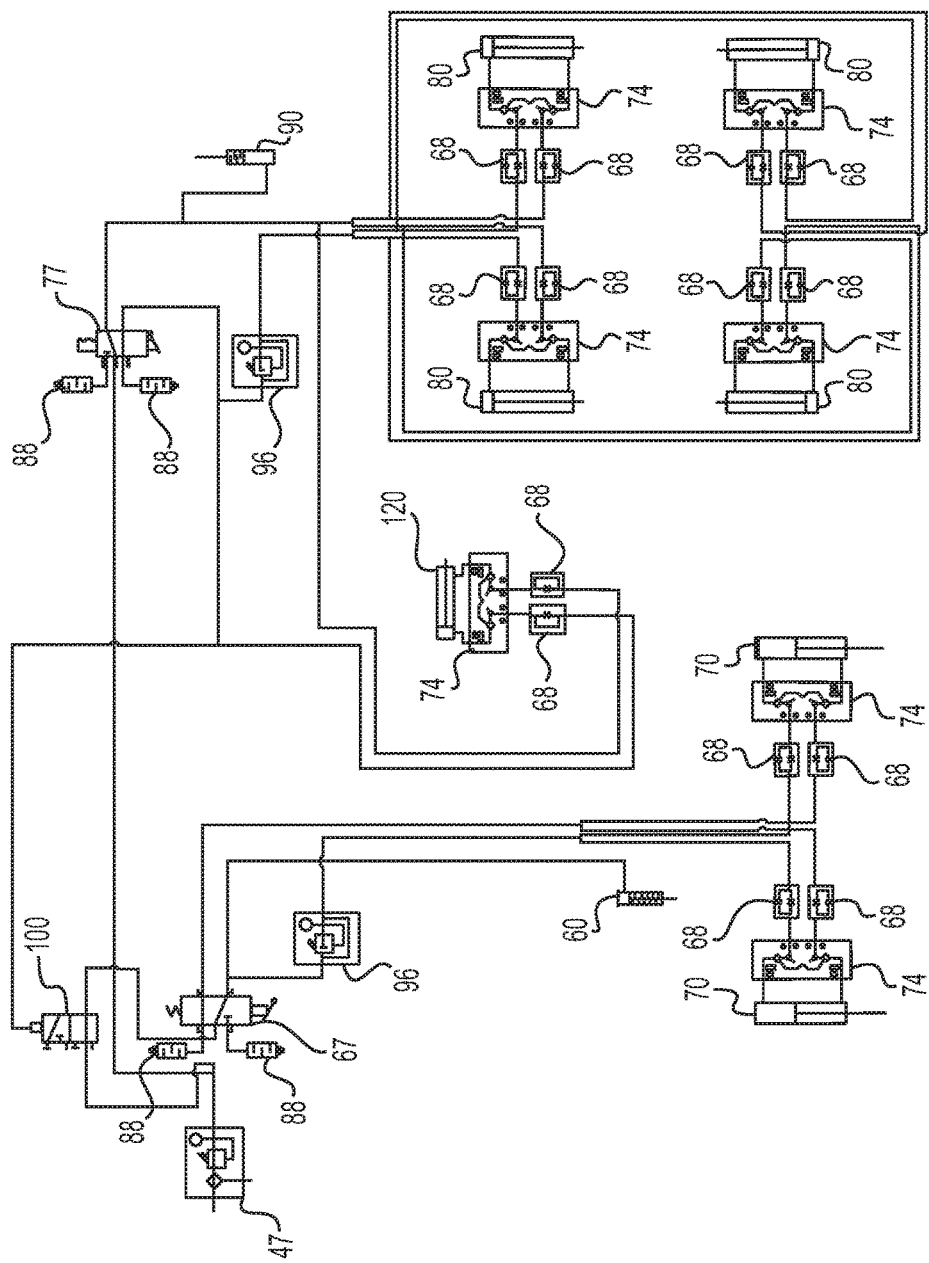
FIG. 7 is a schematic representation of a pneumatic circuit suitable for an embodiment of the present invention and configured in the lowering mode in which a manually operable three-position valve is configured to release the gangway's storage lock and lower the gangway downwardly from the elevated storage orientation, and a manually operable two-position valve is configured to retain the gangway extension platform fully retracted beneath the floor of the distal end of the gangway, to maintain the pivoting panels attached to the cage fully extending outwardly away from the top of the tank and to maintain the gangway lock on the gate fully locked to block worker access to the gangway.
Figure 8:
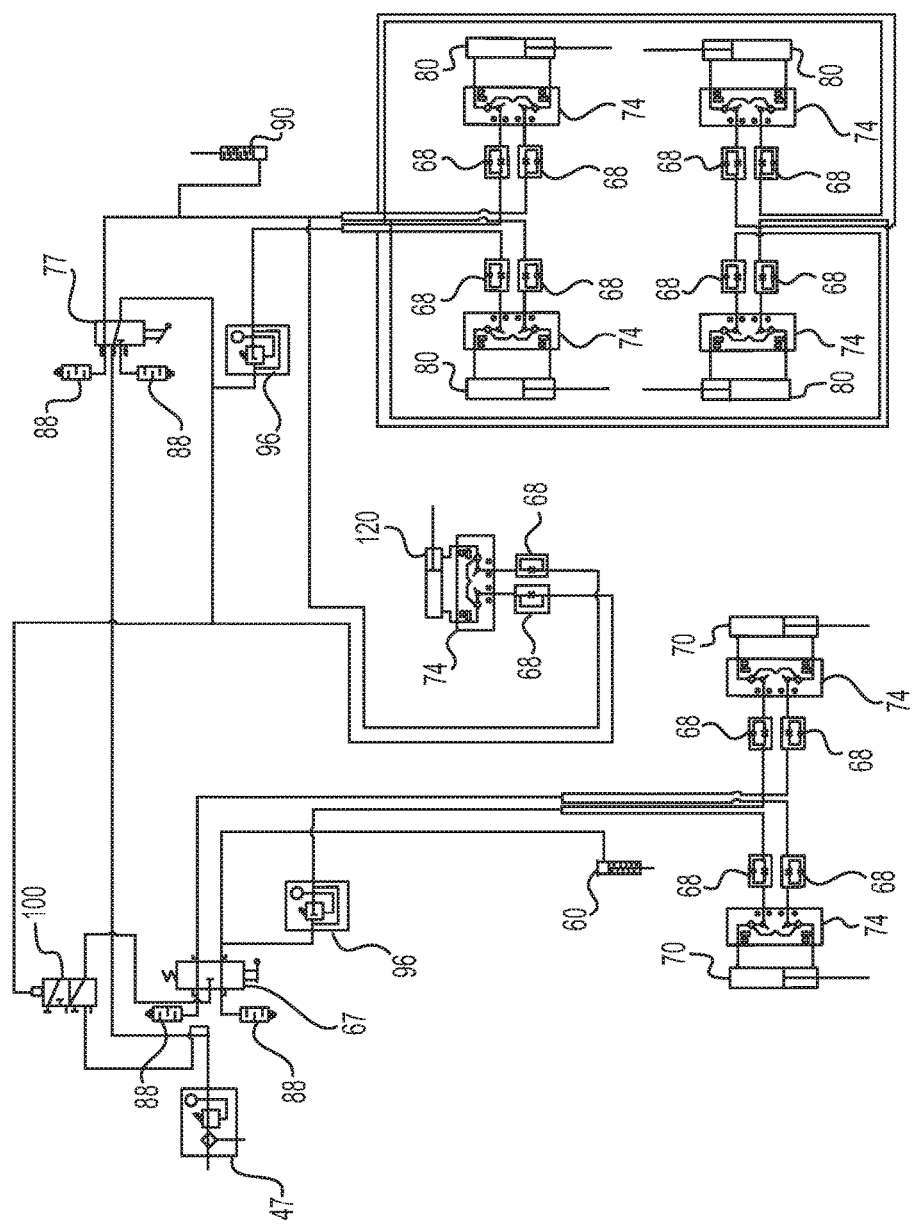
FIG. 8 is a schematic representation of a pneumatic circuit suitable for an embodiment of the present invention and configured in the use mode in which a manually operable three-position valve is configured to maintain the gangway in the lowered position for use by the workers, and a manually operable two-position valve is configured to extend the gangway extension platform from beneath the floor of the distal end of the gangway, to move the pivoting panels attached to the cage inwardly toward the top of the tank and to unlock the gangway lock on the gate to allow worker access to the gangway.
Figure 9:
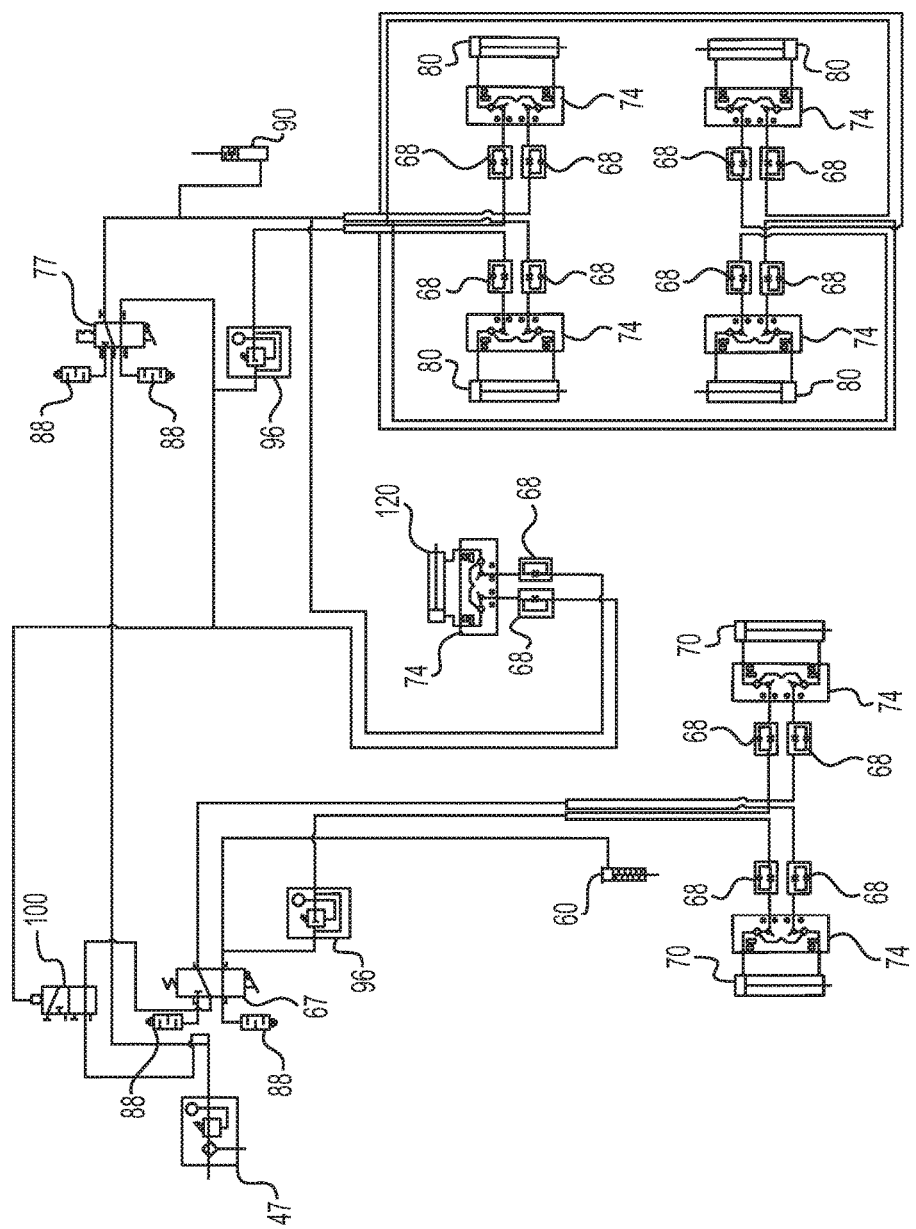
FIG. 9 is a schematic representation of a pneumatic circuit suitable for an embodiment of the present invention and configured in the raising mode in which a manually operable three-position valve is configured to raise the gangway upwardly from the lowered orientation and toward the elevated storage orientation, and a manually operable two-position valve is configured to retract the gangway extension platform beneath the floor of the distal end of the gangway, to move the pivoting panels attached to the cage outwardly away from the top of the tank and to lock the gangway lock on the gate to block worker access to the gangway.

Each of FIGS. 6, 7, 8 and 9 schematically presents the pneumatic circuit 110 configured in a different mode of operation. In FIG. 6, the relationships between the components of the pressure circuit 110 are those by which the apparatus holds the fall protection cage 50 in a stored orientation shown in FIGS. 1 and 5A. The relationships between the components of the pressure circuit 110 shown in FIG. 7 are those that prevail when the apparatus is lowering the fall protection cage 50 from the stored orientation shown in FIGS. 1 and 5A toward the deployed orientation shown in FIGS. 3, 4 and 5B when the fall protection cage 50 will become disposed at the top of the rolling stock. In FIG. 8, the relationships between the components of the pressure circuit 110 are those by which the apparatus holds the fall protection cage 50 in the deployed orientation shown in FIGS. 3, 4 and 5B when the fall protection cage is disposed at the top of the rolling stock and ready for workers to access the top of the rolling stock. The relationships between the components of the pressure circuit 110 shown in FIG. 9 are those that prevail when the apparatus is raising the fall protection cage 50 from the orientation shown in FIGS. 3, 4 and 5B when the fall protection cage is disposed at the top of the rolling stock toward the stored orientation shown in FIGS. 1 and 5A.

Each of the individual components of an exemplary embodiment of an apparatus for selectively controlling a source of pressurized fluid now will be described.

The apparatus for selectively controlling a source of pressurized fluid desirably includes a filter/regulator 47, which is configured to remove solid impurities from the pressurized fluid that is received from the source of pressurized fluid before allowing any pressurized fluid to enter into the pneumatic circuit 110 (or hydraulic circuit as the case may be). Additionally, the filter/regulator 47 is configured to maintain the pressure of the filtered pressurized fluid within 2% of the preset nominal pressure.

The apparatus for selectively controlling a source of pressurized fluid desirably includes a three-position lever operated directional valve 67, a 3/2 pilot/spring return valve 100 and a two-position lever operated directional valve 77. Each valve 67, 100, 77 is provided with an input coupling and an output coupling. Each coupling is provided with a plurality of individual ports, and the valve 67, 100, 77 can be manually operated by the user to select which of the ports of the input coupling is connected to which of the ports of the output coupling. The three-position lever operated directional valve 67 desirably has an open center position and is spring biased to the center position, which is the neutral position of the valve wherein none of the ports of the output coupling receives pressurized fluid from any of the ports of the input coupling of the valve. The two-position lever operated directional valve 77 desirably is maintained in each possible configuration of the valve 77 position by a detent mechanism, which retains the two-position lever operated directional valve 77 in each manually set orientation until the detent is manually overridden. Each exhaust port of the three-position lever operated directional valve 67 and the two-position lever operated directional valve 77 is connected to a muffler 88, which diffuses exhausting gas so as to reduce the noise level when gas (air or nitrogen for example) is exhausted to atmosphere as well as prevents dirt from entering the valve. Each muffler 88 desirably can be provided by a quarter inch NPT muffler 88.

The apparatus for selectively controlling a source of pressurized fluid desirably includes a plurality of dual-action pneumatic cylinders. Each of the gangway lifting cylinders 70, the cage grille pivoting cylinders 80, and the gangway extension cylinder 120, is such a dual-action pneumatic cylinder having a piston that slides within a pressurized enclosure 71 and having a first pressure line connected in communication with the cap end of the cylinder on one side of the piston and a second pressure line connected in communication with the rod end of the cylinder on the opposite side of the piston.

The apparatus for selectively controlling a source of pressurized fluid desirably includes a plurality of dual pilot operated check valves 74. Each of the gangway lifting cylinders 70, the cage grille pivoting cylinders 80, and the gangway extension cylinder 120, is connected to an output coupling of a respective dual pilot operated check valve 74. The output coupling of the dual pilot operated check valve 74 has two output ports. One of these output ports is connected via a first pressure line to the cap end chamber of the cylinder on one side of the piston, and a second output port of the dual pilot operated check valve 74 is connected via a second pressure line to the rod end chamber of the cylinder on the opposite side of the piston.

The input coupling of each dual pilot operated check valve 74 includes a first input port and a second input port. Each dual pilot operated check valve 74 includes a releasable, flow checking mechanism between each respective input port and respective output port. When the releasable, flow checking mechanism is engaged, dual pilot operated check valve 74 only allows flow in the direction from the input port to the output port, but prevents flow in the reverse direction from the output port to the input port. However, when the releasable, flow checking mechanism becomes released, flow is permitted in the direction from the output port to the input port of the dual pilot operated check valve 74.

When the first input port of the dual pilot operated check valve 74 is connected to a source of pressurized fluid, then the pressure overcomes the releasable, flow checking mechanism that exists between the first input port and the first output port and allows the pressurized fluid to exit via the first outlet port and into one side of the piston of the respective dual-action cylinder. Moreover, the flow between the first input port and the first output port at the same time releases the releasable, flow checking mechanism between the second input port and second output port of the dual pilot operated check valve 74, thereby allowing the release of fluid from the opposite side of the piston of the respective dual-action cylinder.

The apparatus for selectively controlling a source of pressurized fluid desirably includes a plurality of flow control valves 68. The first input port of the dual pilot operated check valve 74 is connected via a pressure line to the output of a first flow control valve 68. The second input port of the dual pilot operated check valve 74 is connected via another pressure line to the output of a second flow control valve 68. In operation, each of the first and second flow control valves 68 regulates the rate of movement of the piston of the respective gangway lifting cylinder 70, cage grille pivoting cylinder 80, and gangway extension cylinder 120. One of the flow control valves 68 regulates the movement of the piston in one direction, while the other flow control valve 68 regulates the movement of the piston in the opposite direction. In so doing, each flow control valve 68 ensures a steady controlled movement of the mechanical implements that are connected to each piston of each respective gangway lifting cylinder 70, cage grille pivoting cylinder 80, and gangway extension cylinder 120. Each flow control valve 68 can be set for a predetermined rate of flow, and this rate will determine the rate of movement of the mechanical implements that are connected to each piston of each respective gangway lifting cylinder 70, cage grille pivoting cylinder 80, and gangway extension cylinder 120. Thus, if desired, it is possible to have different rates for the movement of the piston in one direction than for the movement of the piston in the opposite direction.

The apparatus for selectively controlling a source of pressurized fluid desirably includes a gangway lock cylinder 60 and a gate lock cylinder 90. Each of the gangway lock cylinder 60 and the gate lock cylinder 90 is a spring-biased, single action pressure cylinder having a chamber divided by a piston that is slidable within the chamber. The chamber on cap end side of the piston of the gangway lock cylinder 60 and the gate lock cylinder 90 is connected to a pressure line, and the chamber on the opposite side of the piston is spring biased. When the chamber on the cap end side of the piston connected to the pressure line receives pressurized fluid, then the piston moves against the biasing force of the spring. Conversely, when the pressure line is not supplied with a pressurized fluid, then the force exerted by the spring moves the piston in a direction that retracts the piston rod toward the cap end of the chamber.

In the case of the gangway lock cylinder 60 and the gate lock cylinder 90, the spring biases the piston within the cylinder, and the piston is extended from within the cylinder when the pressure line is supplied with pressurized fluid. As schematically shown in FIG. 10, the spring of the gate lock cylinder 90 biases the gate lock in the unlocked position. Only when pressurized fluid is provided to the gate lock cylinder 90, is the gate lock engaged so that the gate 29 is not free to pivot into the open position. As shown in FIG. 11, the spring of the gangway lock cylinder 60 biases the foot lock in the locked position. Only when pressurized fluid is provided to the gangway lock cylinder 60, is the gangway lock released so that the gangway 30 is free to move.

The apparatus for selectively controlling a source of pressurized fluid desirably includes a step down pressure regulator 96 that is configured for mediating between the filter/regulator 47 and each respective one of the gangway lifting cylinders 70, the cage grille pivoting cylinders 80 and the gangway extension cylinder 120. The source of pressurized air provided from the filter/regulator 47 is typically at a much higher pressure than is desired for operation of each respective one of the gangway lifting cylinders 70, the cage grille pivoting cylinders 80 and the gangway extension cylinder 120. Accordingly, each step down pressure regulator 96 is configured for reducing the pressure received at the input of the step down pressure regulator 96 to about 25 psi at the outlet of the step down pressure regulator 96. The reduced pressure of about 25 psi is desired to pressurize the cap-ends of the lifting cylinders 70 for example and thereby extending the piston rod 72 from the pressurized enclosures of the cylinders 70 as schematically shown in FIGS. 2 and 3.

In each of FIGS. 6, 7, 8 and 9, the energized medium, which in this case is a pressurized fluid such as a gas such as dry air or nitrogen, is provided from a source (not shown) to the three-position valve 67 after passage through the filter/regulator 47, which maintains the energized medium within the relatively narrow range of pressures around a targeted 80 PSI gauge. As noted above, the three-position valve 67 depicted in FIGS. 6, 7, 8 and 9 desirably is a manually operated lever-action valve. By manipulation of the lever against the biasing force of the valve's internal spring, the operator can configure the pathways between the central neutral input port (numbered 1), two exhaust ports (numbered 3 and 5) and the two output ports (numbered 2 and 4) of the valve 67 to implement one of three operating modes of the pneumatic circuit 110.

In the stored mode of the pneumatic circuit 110 depicted schematically in FIG. 6, the gangway 30 and cage 50 are stationary, i.e., not moving up (raising) or down (lowering). In the lowering mode of the pneumatic circuit 110 depicted schematically in FIG. 7, the pneumatic circuit 110 is lowering the gangway 30 and cage 50 from the storage orientation shown in FIGS. 1 and 5A to the deployed orientation shown in FIGS. 2, 3, 4 and 5B. In the deployed use mode of the pneumatic circuit 110 depicted schematically in FIG. 8, the gangway 30 and cage 50 are stationary, i.e., not moving up (raising) or down (lowering) but deployed to allow worker access across the gangway and to the top 13*a* of the tank 13 as schematically shown in FIGS. 2, 3, 4 and 5B. When the pneumatic circuit 110 is configured in the deployed mode by appropriate manipulation of the three-position valve 67 as schematically shown in FIG. 8, the gangway 30 and cage 50 can assume and retain themselves in any orientation intermediate the storage orientation of FIGS. 1 and 5A and any of the lowered orientations shown in each of FIGS. 2, 3, 4 and 5B. In the raising mode of the pneumatic circuit 110 depicted schematically in FIG. 9, the pneumatic circuit 110 is raising the gangway 30 and cage 50 toward the storage orientation schematically shown in FIGS. 1 and 5A.

In the storage mode of the pneumatic circuit 110 depicted schematically in FIG. 6, the pressurized conduit leading from the source of pressurized gas is connected to the central neutral input port 1 of the three-position directional valve 67, which in this storage mode shown in FIG. 6 does not allow the pressurized gas to pass through and exit the three-position directional valve 67 via one of the output ports 2, 4 of the valve 67. Instead, each output port 2, 4 of the three-position directional valve 67 is connected to a respective muffler 88. When the gangway 30 is configured in the storage position shown in FIG. 1 and the pneumatic circuit 110 is configured in the stationary mode of operation, then both cage deployment cylinders 70 have their piston rods 72 retracted within their respective pressurized enclosure 71. Because the two output ports 2, 4 of the valve 67 are vented to exhaust to atmosphere, the respective dual pilot operated check valves 74 are closed. Thus, both sides of the piston in the cylinders 70 are at equilibrium, and accordingly the gangway 30 is retained in the storage mode shown in FIGS. 1 and 5A. However, in the event that a leakage of the pressurized gas in the pneumatic circuit 110 were to occur, then the gangway 30 nonetheless would be retained in the storage mode shown in FIGS. 1 and 5A by the gangway lock 27 engaging the foot lock roller pin 28 as shown in FIG. 11.

As schematically shown in FIGS. 3, 4 and 9, the gangway 30 is provided with a foot-operated locking flange 27 that when engaged will retain the gangway 30 in the storage orientation shown in FIGS. 1 and 5A. As schematically shown in FIG. 11, the locking flange 27 is pivotally connected to the piston end of the gangway lock cylinder 60, which in the locked mode of the pneumatic circuit 110 schematically shown in FIG. 6 has its cap-end chamber connected to output port 2 of the three-position directional valve 67. In this locked mode shown in FIG. 6, output port 2 of the three-position directional valve 67 is vented to atmosphere via a muffler 88. Thus, according to the storage mode of the pneumatic circuit 110 shown in FIG. 6, the gangway lock cylinder 60 is configured to enable the locking flange 27 to engage the roller pin 28 schematically depicted in FIG. 11 and retain the gangway 30 to be folded into the storage orientation shown in FIG. 1. In this stationary storage mode of operation of the apparatus for selectively controlling a source of pressurized fluid, the cap end chamber of the gangway lock cylinder 60 is vented to atmosphere, and the mechanical spring mechanism (schematically depicted in FIG. 6) inside the rod end chamber of the gangway lock cylinder 60 biases the piston of the gangway lock cylinder 60 in the fully retracted orientation schematically shown in FIG. 11.

To move the gangway 30 from the storage orientation shown in FIGS. 1 and 5A to a lowered orientation such as shown in FIGS. 2, 3, 4 and 5B for example, the operator must move the lever of the three-position directional valve 67 so as to configure the three-position directional valve 67 as schematically shown in FIG. 7. In the lowering mode of operation schematically shown in FIG. 7, the source of pressurized gas entering the three-position directional valve 67 through input port 1 becomes connected to output port 2 of the three-position directional valve 67. As the pneumatic pressure line leading from output port 2 becomes pressurized with gas at 80 PSI, the cap-end chamber of the gangway lock cylinder 60 becomes pressurized, and the piston becomes extended from the gangway lock cylinder 60 and disengages the foot locking flange 27 shown in FIGS. 4 and 11 from the foot lock roller pin 28. Once disengaged, the gangway 30 becomes released from being retained in the storage orientation shown in FIG. 1. In conjunction with this release of the gangway locking flange 27, the 80 PSI gas is passed through a step down pressure regulator 96 to supply gas at a reduced pressure of about 25 psi (depending on the application) to pressurize the cap end chambers of the lifting cylinders 70 and thereby extending the piston rod 72 from the pressurized enclosures of the cylinders 70 as schematically shown in FIGS. 2 and 3. When the three-position directional valve 67 is configured in this lowering mode of operation as schematically shown in FIG. 7, each of the piston end chambers of the cylinders 70 is exhausted through a respective flow control valve 68 via a dual pilot operated check valve 74. By controlling the flow of exhausting gas from the piston end chambers of the cylinders 70, the respective flow control valves 68 determine the speed at which the piston rods 72 extend from the pressurized enclosures of the cylinders 70 and accordingly the speed at which the gangway 30 is being lowered from the storage orientation depicted in FIGS. 1 and 5A to one of the lowered orientations shown in FIGS. 2, 3, 4 and 5B for example. Once the gangway 30 has attained the orientation desired by the operator and the operator releases the lever of the three-position directional valve 67, then the spring schematically shown in FIG. 8 for example automatically returns the configuration of the three-position directional valve 67 to assume the neutral position schematically shown in FIG. 8. In this neutral position of the three-position valve 67 shown in FIG. 8, both opposite sides of the piston of the lifting cylinders 70 are vented to atmosphere via the mufflers 88. Moreover, as shown in FIG. 8, the 3/2 pilot/spring return valve 100, which is disposed between the source of pressurized fluid and the three-position valve 67, is configured so as to disconnect the three-position valve 67 from the source of pressurized fluid, and thus prevents actuation of the cage deployment cylinders 70.

In the operating mode depicted schematically in FIG. 8, the two-position lever operated directional valve 77 controls the operation of the pivoting cylinders 80a, 80b that are responsible for the movement of the pivoting cage grilles 76 shown in FIGS. 1, 2, 5A and 5B. In the configuration shown in FIG. 8, valve 77 has its input port 1 connected to output port 2. The pneumatic line leading away from output port 2 provides 80 PSI gas to one input port of a dual pilot operated check valve 74 assigned to a respective pivoting cylinder 80 via a flow control valve 68. The output port 4 of valve 77 is connected to an exhaust port 5 so as to vent to atmosphere via a muffler 88. The pneumatic line leading away from output port 4 provides atmospheric pressure to the other input of the dual pilot operated check valve 74 assigned to each respective pivoting cylinder 80 via a respective flow control valve 68. With these respective valves 77, 68 and 74 associated with the respective four pivoting cylinders 80a, 80b configured as shown in FIG. 8, each of the three respective pivoting cage grilles 76 (one outboard and two inboard) is disposed in the fully retracted orientation shown in FIGS. 2 and 5B. Additionally, as shown in FIG. 8, as the pivoting cage grilles 76 are being extended, the 3/2 pilot/ spring return valve 100 is configured so as to disconnect the three-position valve 67 from the source of pressurized fluid, and thus prevents actuation of the pivoting cylinders 80.

To move the gangway 30 from the lowered and deployed orientation shown in FIGS. 2 and 5B to a storage orientation such as shown in FIGS. 1 and 5A for example, the operator must move the lever of valve 67 so as to configure the valve 67 in the raising mode in which the source of pressurized gas entering the valve 67 through input port 1 becomes connected to output port 4 of the valve 67 schematically shown in FIG. 9. As the pneumatic line leading from output port 4 becomes pressurized with gas at 80 PSI, the piston end chambers of the lifting cylinders 70 become pressurized and thereby retract the piston rod 72 into the pressurized enclosures of the cylinders 70 toward the configuration that is schematically shown in FIG. 1. When the valve 67 is configured in this raising mode of operation, each of the cap end chambers of the cylinders 70 is exhausted through a respective flow control 7 via a dual pilot operated check valve 74. By controlling the flow of exhausting gas from the cap end chambers of the cylinders 70, the respective flow control valves 68 determine the speed at which the piston rods 72 are retracted into the pressurized enclosures of the cylinders 70 and accordingly the speed at which the gangway 30 is being raised from the lowered orientation depicted in FIGS. 2 and 5B to the storage orientation shown in FIGS. 1 and 5A for example or to a different use orientation. When the gangway 30 has attained the desired storage orientation shown in FIGS. 1 and 5A, the operator switches the valve 67 to assume the stationary mode depicted in FIG. 6. In this storage orientation of the gangway 30, the cap end chamber of the gangway lock cylinder 60 is exhausted to atmosphere through the muffler 88, with the result that the foot locking flange 27 once again reengages with the foot lock roller pin 28 as shown in FIG. 11, thereby locking the gangway 30 in the stored orientation shown in FIG. 1.

In the embodiment shown in FIG. 8, two-position lever operated directional valve 77 also controls the operation of the pneumatic cylinder 120 that is responsible for the movement of the gangway extension 35 shown in FIGS. 2, 3 and 4. Gangway extension cylinder 120 is mediated by connection to a dual pilot operated check valve 74, which has each of its input ports connected to a respective flow control valve 68 that mediates one line of pneumatic conduit connected at the other end to the valve 77. One side of the piston of the gangway extension cylinder 120 is vented to atmosphere via output port 4 of valve 77. The other side of the piston of the gangway extension cylinder 120 is connected to output port 2 of valve 77 and accordingly is provided with 80 PSI gas. Thus, the gangway extension cylinder 120 is operated between its fully retracted configuration that results in complete retraction of the gangway extension 35 as shown in FIGS. 1 and 4 and its fully extended configuration that results in complete extension of the gangway extension 35 as shown in FIGS. 2 and 3. In the operating mode shown in FIGS. 3 and 8, the extension platform 35 is fully extended. Moreover, the apparatus for selectively controlling a source of pressurized fluid is configured as shown in FIG. 8 so that complete extension of the extension platform 35 only occurs after the cage 50 is lowered in the deployed orientation shown in FIG. 4 for example. Additionally, as shown in FIG. 8, as the extension platform 35 is being extended, the 3/2 pilot/spring return valve 100 is configured so as to disconnect the three-position valve 67 from the source of pressurized fluid, and thus prevents actuation of the cage deployment cylinders 70. In this way, the pneumatic circuit 110 is configured to prevent raising or lowering the cage 50 while the extension platform 35 is fully extended.

In the embodiment of the pneumatic circuit 110 schematically shown in FIG. 8, the two-position lever operated directional valve 77 also controls the operation of the gate locking cylinder 90 that is responsible for the movement of the mechanism that selectively locks and unlocks the gate 29 shown in FIG. 3. This gate 29 controls walking access of workers from the stationary platform 22 (FIG. 2) to the entrance of the gangway 30. The cap end side of the piston of the gate locking cylinder 90 is vented to atmosphere via output port 4 and input port 5 of valve 77. The rod side of the piston of the gate locking cylinder 90 is biased by the spring to retract the piston rod into the gate lock cylinder 90 in the operating mode shown in FIG. 8. Thus, gate locking cylinder 90 is operated between its fully retracted configuration schematically shown in FIGS. 3 and 8 that unlocks the gate 29 and permits workers to swing open the gate 29 and gain access from the platform 22 through the entrance of the gangway 30 as shown in FIG. 3 and its fully extended configuration schematically shown in FIGS. 6, 7 and 9 that locks the gate 29 and prevents workers from opening the gate 29 to gain access through the entrance of the gangway 30 and proceed onto the top 13a of the tank 13.

In alternative embodiments, hydraulic circuits can be substituted for the pneumatic circuits, except that venting to atmosphere is not permitted in the hydraulic circuit. In alternative embodiments, electrically actuatable solenoids can be substituted for the pneumatic valves 2, 5 and/or pneumatic or hydraulic circuits. Additionally, a programmable controller can be provided to receive signals from sensors and accordingly make adjustments to the electrically actuatable solenoids without operator assistance.

What is claimed is:

1. An apparatus for selectively controlling a source of pressurized fluid and thereby controlling the movement of a fall protection cage configured for surrounding a section of a work area at the top of rolling stock, the apparatus comprising:
    a fall protection cage configured to be extendable between a deployment orientation at a top of rolling stock and a storage orientation spaced apart from the top of rolling stock;
    a gate pivotable between a closed position preventing worker access into the fall protection cage and an open position allowing worker access into the fall protection cage;
    a gate lock configured and disposed for selectively assuming a locked orientation for selectively locking the gate in the closed position and alternatively assuming an unlocked orientation for selectively freeing the gate to assume the open position;
    a two-position lever operated directional valve having an inlet coupling connected via a first pressure line to the source of pressurized fluid, the two-position lever operated directional valve having an outlet coupling; and
    a gate lock cylinder having an inlet connected via a second pressure line to the outlet coupling of the two-position lever operated directional valve, the gate lock cylinder being connected to the gate lock; and
    wherein the two-position lever operated directional valve is configured for selectively connecting the first pressure line to the second pressure line whereby the gate lock cylinder becomes biased to maintain the gate lock in the locked orientation.

2. The apparatus of claim 1, further comprising:
    a grille pivotally connected along one side of the fall protection cage with a range of pivotal movement between a closed position disposing a free edge of the grille toward the interior of the fall protection cage and an open position disposing the free edge of the grille away from the interior of the fall protection cage; and
    a grille cylinder connected to the grille and configured for selectively pivoting the grille to assume a preselected position within the range of pivotal movement.

3. The apparatus of claim 2, further comprising:
    a dual pilot operated check valve connected to the grille cylinder, the dual pilot operated check valve having a first inlet and a second inlet, the dual pilot operated check valve having a first outlet and a second outlet;
    a first flow control valve and a first pressure line connecting the first flow control valve to the first inlet of the dual pilot operated check valve;
    a second flow control valve and a second pressure line connecting the second flow control valve to the second inlet of the dual pilot operated check valve;
    a third pressure line connecting the first flow control valve to the outlet coupling of the two-position lever operated directional valve; and
    a fourth pressure line connecting the second flow control valve to the outlet coupling of the two-position lever operated directional valve;
    wherein the two-position lever operated directional valve is configured for selectively connecting the third pressure line to the first flow control valve whereby the grille cylinder becomes biased to maintain the grille in the closed position; and wherein the two-position lever operated directional valve is configured for selectively connecting the fourth pressure line to the second flow control valve whereby the grille cylinder becomes biased to maintain the grille in the open position.

4. The apparatus of claim 1, further comprising:

a gangway having a forward end connected to an inboard side of the fall protection cage at an access opening defined through the inboard side, the gangway having a back end disposed spaced apart from the forward end;

a gangway extension platform slidably connected to the forward end of the gangway with a range of sliding movement between a retracted position disposing the gangway extension platform beneath the gangway and an extended position disposing the free edge of the gangway extension platform away from the gangway; and a gangway extension platform cylinder connected to the gangway extension platform and configured for selectively sliding the gangway extension platform to assume a preselected position within the range of sliding movement.

5. The apparatus of claim 4, further comprising:

a dual pilot operated check valve connected to the gangway extension platform cylinder, the dual pilot operated check valve having a first inlet and a second inlet, the dual pilot operated check valve having a first outlet and a second outlet;

a first flow control valve and a first pressure line connecting the first flow control valve to the first inlet of the dual pilot operated check valve;

a second flow control valve and a second pressure line connecting the second flow control valve to the second inlet of the dual pilot operated check valve;

a third pressure line connecting the first flow control valve to the outlet coupling of the two-position lever operated directional valve; and a fourth pressure line connecting the second flow control valve to the outlet coupling of the two-position lever operated directional valve;

wherein the two-position lever operated directional valve is configured for selectively connecting the third pressure line to the first flow control valve whereby the gangway extension platform cylinder becomes biased to maintain the gangway extension platform in the retracted position; and wherein the two-position lever operated directional valve is configured for selectively connecting the fourth pressure line to the second flow control valve whereby the gangway extension platform cylinder becomes biased to maintain the gangway extension platform in the extended position.

6. The apparatus of claim 1, further comprising:

a gangway having a forward end configured for connection to an inboard side of the fall protection cage at an access opening defined through the inboard side, the gangway having a back end disposed spaced apart from the forward end and between the forward end and the gate when the gate is disposed in the closed position.

7. The apparatus of claim 1, further comprising:

a first valve pressure line configured for connection to the source of pressurized fluid;

a three-position lever operated directional valve having an inlet coupling connected to the first valve pressure line, the three-position lever operated directional valve having an outlet coupling;

a cage deployment cylinder connected to the outlet coupling of the three-position lever operated directional valve and configured for selectively deploying the fall protection cage to assume a preselected position within the range of movement between the storage orientation and a deployed orientation; and a 3/2 pilot/spring valve connected to the inlet coupling of the three-position lever operated directional valve.

* * * * *